United States Patent [19]

Buschmann et al.

[11] Patent Number: 4,638,657
[45] Date of Patent: Jan. 27, 1987

[54] DEVICE FOR MEASURING THE WINDING HARDNESS OF A STRIP, ESPECIALLY A STRIP OF PAPER, WOUND INTO A REEL

[75] Inventors: Gerhard Buschmann, Dusseldorf; Georg Muller, Neuss, both of Fed. Rep. of Germany

[73] Assignee: Jagenberg Ag, Dusseldorf, Fed. Rep. of Germany

[21] Appl. No.: 745,761

[22] Filed: Jun. 17, 1985

[30] Foreign Application Priority Data

Jul. 17, 1984 [DE] Fed. Rep. of Germany ....... 3426301

[51] Int. Cl.$^4$ .............................................. G01N 3/00
[52] U.S. Cl. .......................................... 73/78; 73/159
[58] Field of Search ..................... 73/78, 159; 162/263, 162/198

[56] References Cited

U.S. PATENT DOCUMENTS 3,385,105 5/1968 Smith ...................................... 73/159
3,540,270 11/1970 Wolfer ...................................... 73/78

Primary Examiner—Stewart J. Levy
Assistant Examiner—Robert R. Raevis
Attorney, Agent, or Firm—Sprung Horn Kramer & Woods

[57] ABSTRACT

A device for measuring the winding hardness of a strip, especially a strip of paper, that has been wound into a reel. The device consists of a mechanism for extracting a slip that has been inserted tight between two coils of the reel of paper with one end extending out of the side of the reel and of a dynamometer that measures the force necessary to extract the slip over a certain distance. To allow winding hardness to be displayed directly rather than in the form of a graph, the slip-extracting mechanism operates at a constant extracting speed, a pulse generator that is supplied with the resulting force, or with a control signal derived from it, by the dynamometer supplies counting pulses to an up-down counter at a frequency that is proportional to the force, and the slip-extracting mechanism is connected to an odometer that, when it detects equal distances, switches the counter from up to down and stops it.

2 Claims, 2 Drawing Figures

DEVICE FOR MEASURING THE WINDING HARDNESS OF A STRIP, ESPECIALLY A STRIP OF PAPER, WOUND INTO A REEL

BACKGROUND OF THE INVENTION

The present invention relates to a device for measuring the winding hardness of a strip, especially a strip of paper, that has been wound into a reel, the device consisting of a mechanism for extracting a slip that has been inserted tightly between two coils of the reel of paper with one end extending out of the side of the reel and of a dynamometer that measures the force necessary to extract the slip over a certain distance.

In a known measuring device of this type the winding hardness is determined graphically. The force necessary to extract the slip over a certain distance is plotted in a graph and the mean slope of the resulting curve is used as a measure of winding hardness.

Errors can occur as the result of the coefficient of friction of the material employed. A known way of avoiding these errors is to enclose the slip in an envelope before laying it between the coils. The envelope remains in the reel when the slip is extracted.

SUMMARY OF THE INVENTION

The object of the present invention is to provide a measuring device of the type initially described that will display the winding hardness directly without graphic intervention.

This object is attained in accordance with the invention, wherein the slip-extracting mechanism operates at a constant extracting speed, a pulse generator that is supplied with the resulting force, or with a control signal derived from it by the dynamometer, supplies counting pulses to an up-down counter at a frequency that is proportional to the force, and the slip-extracting mechanism is connected to an odometer that, when it detects equal distances, switches the counter from up to down and stops it.

Once the counter has been stopped, the measuring device in accordance with the invention supplies a count that is a measure of winding hardness. Since the slip-extracting mechanism operates at a constant speed and since the counter is switched from up to down counting subsequent to the detection of equal distances, the resulting counts can be compared and used as a measure of the mean slope of the force curve over the distance and hence of winding hardness.

A preferred embodiment of the invention will now be described with reference to the attached drawing, wherein

DETAILED DESCRIPTION OF THE INVENTION

Figure 1:
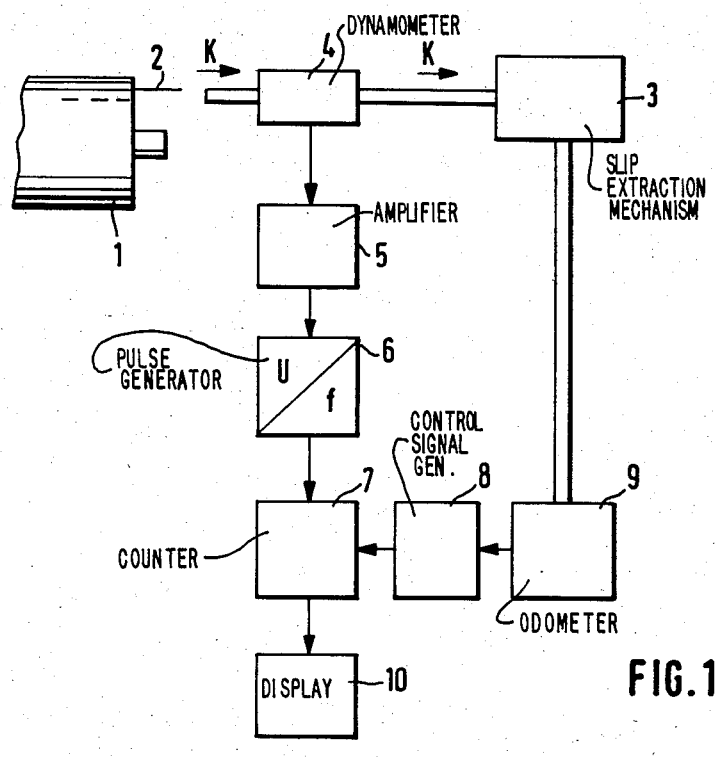
FIG. 1 is a device according to the invention for measuring the winding hardness of a strip that has been wound into a reel and FIG. 2 is a graph of the force needed to extract a slip laid between two coils of a reel over a certain distance.

Referring to FIG. 1, a slip or piece of paper 2 is laid in a known way in the reel 1 while a strip, especially a strip of paper, is being wound or coiled to form a plurality of coils. Slip 2 extends into the reel to a prescribed distance between two coils and one end extends out of the reel at the side. To obtain a reading of the winding hardness over the radius of the reel, several such strips of the same length are laid between different coils. To obtain results that are independent of the material being wound, slips 2 are, in a way that is also known, laid between the coils in envelopes that are not illustrated in the drawing and the envelopes remain in the reel when the slips are removed.

The measuring device that is actually employed to extract slip 2 consists of a mechanism 3 that extracts it from reel 1 through a dyanmometer 4 at a constant speed. Slip-extracting mechanism 3 can be a wire strain gauge or a quartz generator. In either case, dynamometer 4 supplies, in conjunction with an amplifier 5, a voltage signal that depends on the tensile force to a pulse generator 6. Pulse generator 6 supplies counting pulses that depend in frequency on the voltage and hence also on the force to an up-down counter 7. Counter 7 is started by a control-signal generator 8 that also switches the counter from counting up to counting down and stops it at the end. Control-signal generator 8 itself is controlled with a distance-dependent signal from an odometer 9 that is connected to mechanism 3. Finally, a display 10 that displays the count from up-down counter 7 is connected to the counter.

To determine winding hardness with the device, slip 2 is attached to slip-extracting mechanism 3 through dynamometer 4. Once slip-extracting mechanism 3, which operates at a constant speed, has been turned on, control-signal generator 8 starts up-down counter 7 counting up. The counter counts the pulses of initially high and then decreasing frequency supplied from pulse generator 6. Upon completion of a certain distance $S_1$ (see FIG. 2) up-down counter 7 receives from control-signal generator 8 a signal that switches it from counting up to counting down. The counter is stopped subsequent to completion of an equally long distance $S_2$. The resulting display 10 is a measure of winding hardness.

Figure 2:
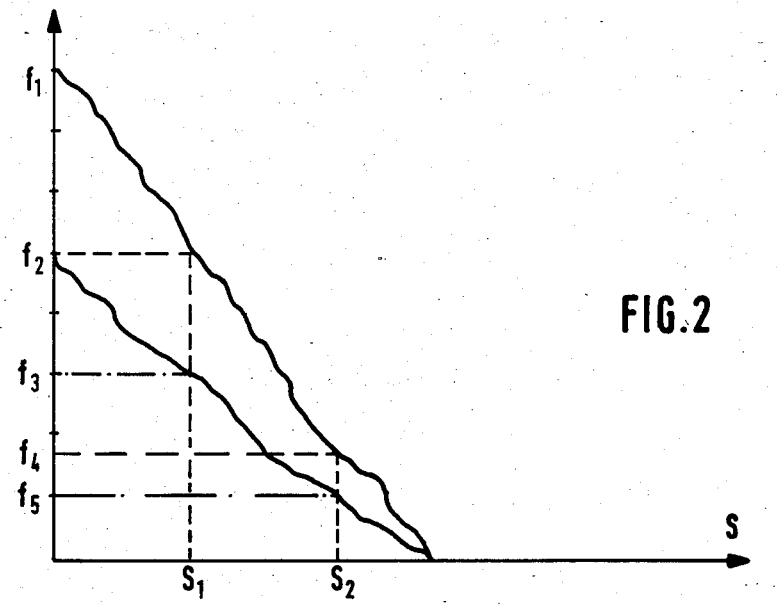

The two curves in FIG. 2 illustrate tensional forces for different winding hardnesses. Counting for the higher hardness, which is represented by the steeper curve, begins at frequency $f_1$, which is essentially higher than initial frequency $f_2$, at which counting begins for the more level curve. This means that the count for the steeper curve will be essentially higher than that for the more level curve by the time distance $S_1$ is attained which corresponds to frequencies $f_2$ and $f_3$ respectively. The same situation occurs for counting down between distances $S_1$ and $S_2$. Upon completion of counting at distance $S_2$ when frequencies $f_4$ and $f_5$ are reached, display 10 will exhibit a higher count for the steeper curve that for the more level curve. The higher count thus signifies a higher winding hardness.

It is understood that the specification and examples are illustrative but not limitative of the present invention and that other embodiments within the spirit and scope of the invention will suggest themselves to those skilled in the art.

What is claimed is:

1. In a device for measuring the winding hardness of a strip wound into a reel with a plurality of coils, the device including a mechanism for extracting a slip of paper that has been inserted tightly between two coils of the reel of paper with one end extending out of the side of the reel and a dynamometer for measuring the force necessary to extract the slip over a certain distance, the improvement comprising: means for extracting the slip at a constant extracting speed; a pulse generator for producing counting pulses having a frequency proportional to the force measured by the dynamometer; an up-down counter receptive to the counting pulses; an odometer for detecting equal distances of movement of the slip; and means for switching the counter from up to down when a given distance is reached and stopping the counter when a distance equal to the given distance is again reached as detected by the odometer.

2. In a method for measuring the winding hardness of a strip wound into a reel with a plurality of coils, wherein a slip of paper is inserted tightly between two coils of the reel of paper with one end extending out of the side of the reel and is extracted, with the force necessary to extract the slip over a certain distance measured by a dynamometer, the improvement comprising: extracting the slip at a constant extracting speed; generating pulses at a frequency that is proportional to the force measured by the dynamometer; supplying the pulses to an up-down counter; measuring equal distances traveled by the slip during extraction; and switching the counter from up to down when a first distance is reached and stopping the counter when a second distance equal to the first distance is reached, whereby the resulting count in the counter is corresponding to the winding hardness of the reel.

* * * * *